United States Patent [19]

Palmin et al.

[11] Patent Number: 4,714,867
[45] Date of Patent: Dec. 22, 1987

[54] METHOD AND APPARATUS FOR CONTROLLING A STEPPER MOTOR WITH A PROGRAMMABLE PARABOLIC VELOCITY PROFILE

[75] Inventors: Simyon Palmin, Sharon; Vladimir Shlain, Brookline, both of Mass.

[73] Assignee: Design Components Incorporated, Franklin, Mass.

[21] Appl. No.: 913,537

[22] Filed: Sep. 30, 1986

[51] Int. Cl.$^4$ .............................................. H02P 8/00
[52] U.S. Cl. ..................................... 318/696; 318/685
[58] Field of Search ................. 318/696, 685; 101/158

[56] References Cited

U.S. PATENT DOCUMENTS

| | | | |
|---|---|---|---|
| 4,156,170 | 5/1979 | Strunc | 318/696 |
| 4,417,188 | 11/1983 | Makabe et al. | 318/696 |
| 4,496,891 | 1/1985 | Kobayashi | 318/696 |
| 4,496,892 | 1/1985 | Bugatto, Jr. | 318/696 |
| 4,558,643 | 12/1985 | Arima et al. | 101/158 |
| 4,568,866 | 2/1986 | Floro et al. | 318/696 |

OTHER PUBLICATIONS

Kuo, *Step Motors and Control Systems*, SRL Publishing Co., 1979, pp. 135-143, 290-304, 391-402.

*Primary Examiner*—William M. Shoop, Jr.
*Assistant Examiner*—Saul M. Bergmann
*Attorney, Agent, or Firm*—Wolf, Greenfield & Sacks

[57] ABSTRACT

A stepper motor is accelerated and decelerated with a parabolic velocity profile to efficiently utilize the available torque of the motor. The times between pulses to obtain a parabolic velocity profile are determined by a microprocessor-based stepper motor controller from desired values of start/stop velocity, maximum velocity and time to reach maximum velocity. The required times are stored in a random access memory and are used to supply to the motor a pulse train which follows the parabolic velocity profile during acceleration and deceleration. The controller is easily programmable to accommodate different motor characteristics, different applications and different operating parameters.

16 Claims, 6 Drawing Figures

METHOD AND APPARATUS FOR CONTROLLING A STEPPER MOTOR WITH A PROGRAMMABLE PARABOLIC VELOCITY PROFILE

FIELD OF THE INVENTION

This invention relates to stepper motor controllers and, more particularly, to methods and apparatus for stepper motor control which provide a parabolic velocity profile for rapid acceleration and deceleration, and which are programmable so that a selected velocity can be reached in a selected time.

BACKGROUND OF THE INVENTION

Stepper motors are widely used in applications requiring accurate position control and compatibility with digital control systems. Electrical pulses of prescribed pulse width and amplitude advance the motor by a predetermined distance for each pulse. One standard stepper motor type requires 200 pulses for one complete revolution, thus providing 1.8° of revolution per pulse. When a pulse train is supplied to the stepper motor, it rotates continuously at a rate determined by the pulse repetition frequency. One advantage of a stepper motor is that its position can be determined by counting the pulses supplied to it, assuming that no slippage occurs.

One drawback of stepper motors is that acceleration and deceleration times have been relatively long due in part to the available torque characteristic of stepper motors. During acceleration and deceleration, the stepper motor is accelerated and decelerated in accordance with a predetermined velocity profile, or velocity variation as a function of time. Linear ramping of stepper motor velocity is well known in the art and requires a constant torque. Exponential velocity profiles have also been utilized. See, for example, Kuo, *Step Motors and Control Systems*, SRL Publishing Co., 1979, pp. 135–143. A linear velocity increase followed by an exponential increase is disclosed in U.S. Pat. No. 4,496,891 issued Jan. 29, 1985 to Kobayashi. Any velocity profile is limited by the torque available from the motor. Stepper motors have a torque versus speed characteristic which is maximum at low speed and decreases with increasing speed. If the available torque curve is exceeded during acceleration or deceleration, the motor will stall. As a result, it is necessary to utilize a velocity profile wherein the required torque stays below the available torque by a given safety margin. In the linear case, the required torque is constant and is limited by the available torque at the highest operating speed. Consequently, the relatively high torque available at low speed is not utilized. It is desirable to provide a velocity profile which efficiently utilizes the available torque of the stepper motor so that optimum acceleration and deceleration characteristics can be achieved.

A further drawback of existing stepper motor controllers relates to the difficulty in implementing different maximum motor velocities and acceleration/deceleration times. Prior art controllers have usually utilized analog circuitry such as constant current charging of a capacitor for generating a linear velocity profile and constant voltage charging of a capacitor for generating an exponential velocity profile. Accurate programming of such circuits entails substantial complexity and expense. It is desirable to provide a stepper motor controller in which the velocity profile during acceleration and deceleration can be easily programmed to accommodate different motor characteristics, different applications, and different operating parameters. Stepper motor controllers utilizing microprocessors are disclosed in U.S. Pat. Nos. 4,496,891, Kobayashi; 4,417,188, Makabe et al; 4,156,170, Strunc and 4,568,866, Floro et al. However, it is believed that none of the disclosed systems fully utilize the available stepper motor torque to obtain high acceleration and deceleration rates without stalling or missing steps.

It is a general object of the present invention to provide improved methods and apparatus for stepper motor control.

It is another object of the present invention to provide methods and apparatus for stepper motor control utilizing a parabolic velocity profile as a function of time.

It is yet another object of the present invention to provide methods and apparatus for stepper motor control wherein a parabolic velocity profile is determined from selected values of start/stop velocity, maximum velocity and time to reach maximum velocity, and is stored in a random access memory.

It is still another object of the present invention to provide methods and apparatus for stepper motor control which are easily programmed to accommodate different motor characteristics, different applications and different operating parameters.

SUMMARY OF THE INVENTION

According to the present invention, these and other objects and advantages are achieved in a stepper motor controller comprising means for supplying to the stepper motor a series of electrical pulses of suitable amplitude and pulse width to advance the stepper motor, and means for controlling the times between the pulses to provide a parabolic stepper motor velocity profile as a function of time between a start/stop velocity $V_0$ and maximum velocity $V_m$ in a time T. The parabolic velocity profile efficiently utilizes the available torque of the stepper motor in accelerating to velocity $V_m$ and in decelerating from velocity $V_m$ to velocity $V_0$.

According to another aspect of the invention, there is provided apparatus for controlling a stepper motor comprising means for determining the required times between individual motor energizing pulses to provide a parabolic velocity profile between a start/stop velocity $V_0$ and a maximum velocity $V_m$ in a preselected time T, and means for supplying to the stepper motor a train of energizing pulses with times between individual pulses controlled in accordance with the required times to provide the parabolic velocity profile.

According to yet another aspect of the present invention, there is provided a method for controlling a stepper motor comprising the steps of selecting a desired time T to increase the motor velocity from a predetermined start/stop velocity $V_0$ to a desired maximum velocity $V_m$, determining from $V_0$, $V_m$ and T the required times between motor energizing pulses to provide a parabolic velocity profile between $V_0$ and $V_m$ in time T, and supplying to the stepper motor a train of energizing pulses with times between individual pulses controlled to provide the parabolic velocity profile.

In a preferred embodiment, the stepper motor controller includes a microprocessor which calculates the required times between pulses to provide a parabolic velocity profile and stores the calculated times in a random access memory. The stored values of time are read out during motor acceleration and deceleration and determine stepping pulse timing. The microprocessor and random access memory provide flexibility in programming parabolic velocity profiles for different selected values of start/stop velocity $V_0$, maximum velocity $V_m$ and time T.

BRIEF DESCRIPTION OF THE DRAWINGS

For a better understanding of the present invention, together with other and further objects, advantages and capabilities thereof, reference is made to the accompanying drawings which are incorporated herein by reference and in which.

DESCRIPTION OF THE PRIOR ART

Figure 1:
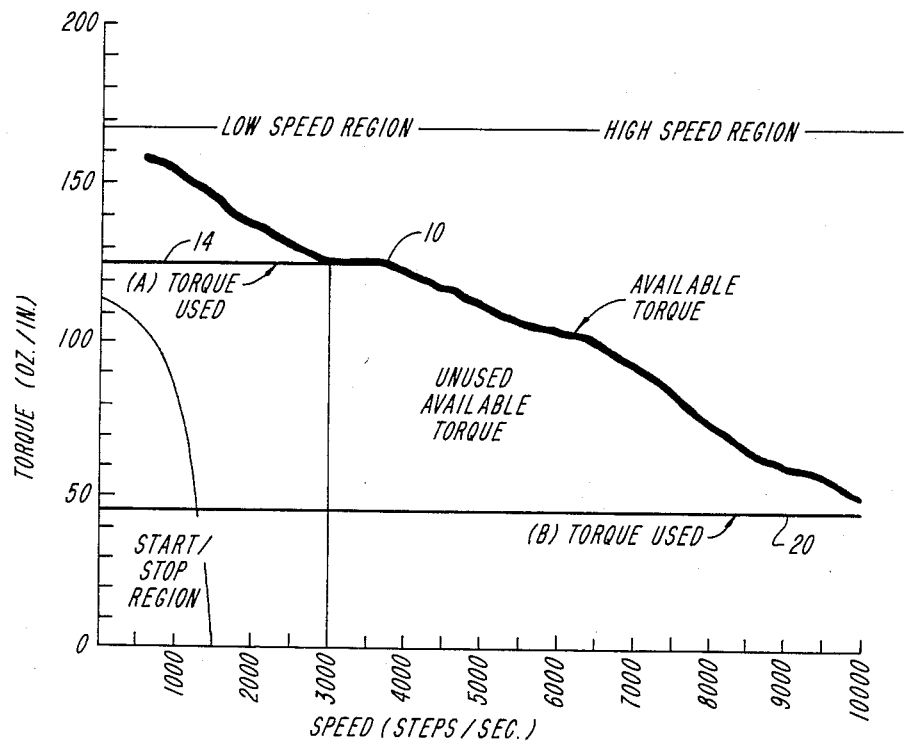
FIG. 1 is a graphic representation of torque as a function of speed illustrating the available torque characteristic for stepper motors and the torque required for linear velocity profiles in accordance with the prior art.
Figure 2:
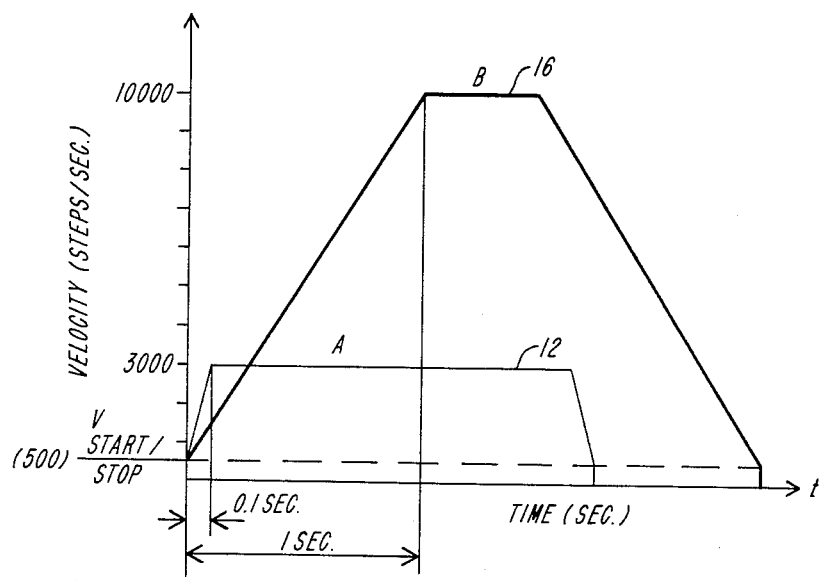
FIG. 2 is a graphic representation of velocity as a function of time illustrating linear velocity profiles in accordance with the prior art.

The operation of a stepper motor controller utilizing a linear velocity profile is illustrated in FIGS. 1 and 2. The available torque from a conventional stepper motor as a function of speed is illustrated as curve 10 in FIG. 1. The available torque decreases from a maximum at low speed to a lower value at high speed. Although the available torque curve may vary in shape and amplitude for different stepper motors, all exhibit a decrease in available torque with increasing speed. For a linear velocity profile, both the acceleration and torque are constant during starting and stopping. For a relatively low maximum velocity, as indicated by velocity profile 12 in FIG. 2, a higher rate of acceleration can be used to reach the maximum velocity. Since more torque is available at lower speeds, higher torque and acceleration can be used to reach a lower speed, as indicated by line 14 in FIG. 1. However, for a relatively high maximum velocity, as indicated by velocity profile 16 in FIG. 2, the rate of acceleration must be decreased to achieve a linear velocity profile without exceeding the available torque. For high maximum velocity, the torque indicated by line 20 in FIG. 1 must be utilized. If one were to attempt to accelerate to high speed (for example, 10,000 steps/sec) along line 14, the motor would stall at 3000 steps/sec. As a result, the portion of the available torque above the curve 20 is unused in velocity profile 16, and the motor reaches its final operating speed relatively slowly and inefficiently.

DETAILED DESCRIPTION OF THE INVENTION

Figure 3:
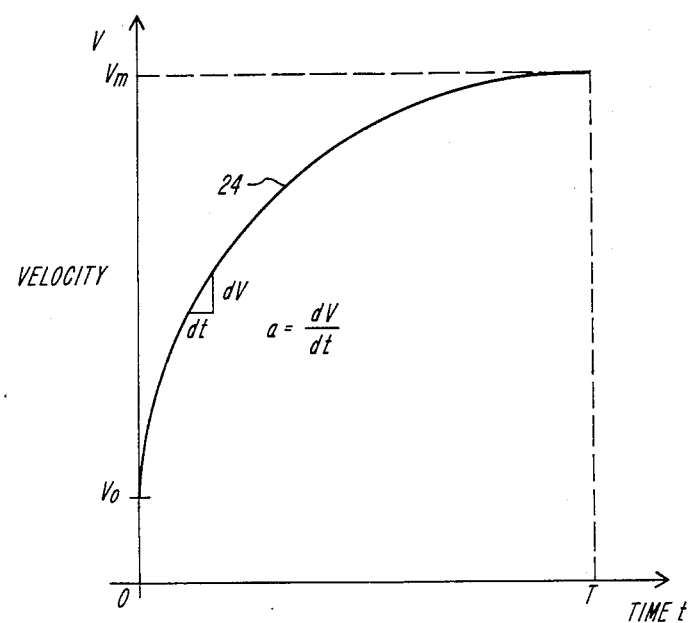
FIG. 3 is a graphic representation of velocity as a function of time illustrating a parabolic velocity profile in accordance with the present invention.

In accordance with the present invention, a stepper motor controller drives a stepper motor with a parabolic velocity profile which is programmed to match the operating characteristics of the particular stepper motor being used and the application requirements. A parabolic velocity profile as a function of time in accordance with the present invention is shown in FIG. 3 as curve 24. The motor increases in velocity from a start/stop, or minimum, velocity $V_0$ to a maximum velocity $V_m$ in a time T. The start/stop velocity $V_0$, a characteristic of the motor and the load, is the speed at which the motor and the load initially start to accelerate and the speed at which the motor and load finally stop after deceleration. The parabolic velocity profile utilizes an inverted parabola with the point $V=V_m$, $t=T$ located at the apex on the axis of the parabola. During deceleration of the motor, a parabolic velocity profile is also utilized. The parabola is inverted with its apex located at the point where motor deceleration is initiated. The velocity decreases on the parabolic curve until the start/stop velocity $V_0$ is reached.

In FIG. 3 it can be seen that during motor acceleration, the velocity initially increases rapidly from $V_0$ and then increases more and more slowly as the maximum velocity $V_m$ is approached. The acceleration is given by the slope of the velocity curve which, in the case of a parabola, is a linear function. In the case of an inverted parabola, as shown in FIG. 3, the acceleration is a linear function of time which decreases from a high value upon starting to zero at the apex of the parabola. Since torque is proportional to acceleration, the required torque to achieve a parabolic velocity profile is a linear function of time which decreases from a maximum value on startup to zero upon reaching $V_m$.

Figure 4:
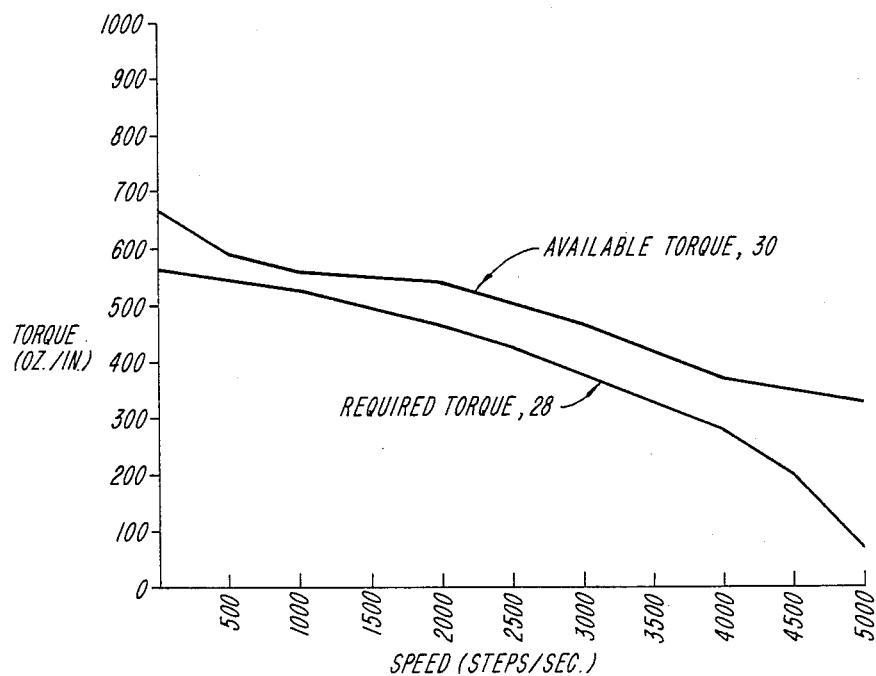
FIG. 4 is a graphic representation of torque as a function of speed illustrating the available torque characteristic of a stepper motor and the required torque for a parabolic velocity profile in accordance with the present invention.

The required torque to produce the parabolic velocity profile and the available torque from a stepper motor are plotted in FIG. 4 as a function of speed. Required torque is plotted as curve 28 and available torque is plotted as curve 30. It is apparent that the parabolic velocity profile requires a torque curve 28 which matches the available torque curve 30 thereby providing efficient acceleration and deceleration characteristics.

When the motor is decelerated, the required torque curve 28 in FIG. 4 is traversed in reverse direction such that at high speeds the deceleration is relatively low and, as the motor slows down, the deceleration increases until the start/stop velocity $V_0$ is reached.

It is necessary to maintain the required torque curve 28 shown in FIG. 4 at least slightly below the available torque curve 30 at every point. If the required torque exceeds the available torque, unacceptable stalling of the motor will occur.

In implementing a controller which provides the parabolic velocity profile shown in FIG. 3, it is desirable to provide programmability for a selected start/stop velocity $V_0$, maximum velocity $V_m$ and time T. A programmable controller with selectable values of $V_0$, $V_m$ and T will permit utilization with a variety of different motors and in a variety of different applications. However, the selected values must result in a parabolic velocity profile within the capabilities of the particular motor being controlled. That is, the resulting velocity profile cannot exceed the available torque of the particular motor being used.

Figure 6:
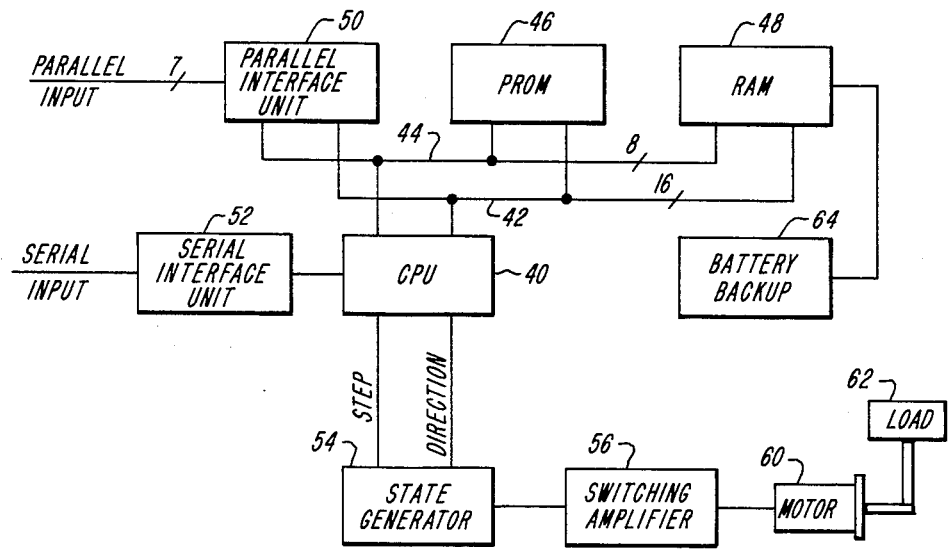
FIG. 6 is a block diagram of a stepper motor controller for providing a parabolic velocity profile.

In accordance with the present invention, there is provided a microprocessor-based stepper motor controller which receives selected values of $V_0$, $V_m$ and T, determines the required times between energizing pulses to achieve a parabolic velocity profile, and supplies the required pulses to the motor. A schematic block diagram of a stepper motor controller in accordance with the present invention is shown in FIG. 6. Examples of systems which can use a stepper motor and controller in accordance with the present invention are positioning systems, such as x-y tables, and wafer handling systems. Such systems require accurate positioning and fast response.

Referring now to FIG. 6, a microprocessor 40 is coupled by an address bus 42 and a data bus 44 to a programmable read-only memory (PROM) 46. Typically, the address bus 42 comprises sixteen lines and the data bus 44 comprises eight lines. The microprocessor 40 is also coupled by the address bus 42 and the data bus 44 to a random access memory (RAM) 48. A parallel input to the controller is connected through a parallel interface unit 50 to the buses 42, 44. A serial input to the controller is coupled through a serial interface unit 52 directly to the microprocessor 40. Step and direction outputs from the microprocessor 40 are coupled to a state generator 54. The step output causes an energizing pulse to be sent to the motor, while the direction output indicates the required direction of motor movement. The outputs of the state generator 54 are coupled through a switching amplifier 56 to a stepper motor 60 which in turn drives a load 62. The controller includes necessary voltage supplies (not shown) for operation of its components. A battery back-up unit 64 is connected to the RAM 48 and maintains voltage on the RAM 48 in the event that the voltage supplies fail.

Initially, selected values of $V_0$, $V_m$ and T are supplied to the controller, either through the serial input or the parallel input. These values are based on the requirements of motor operation, the characteristics of the selected stepper motor 60 and the load 62. For a conventional stepper motor, the pulse duration and pulse amplitude are fixed and the required times between individual pulses to provide a parabolic velocity profile are computed by the microprocessor 40. A software routine for calculating the required times is stored in the PROM 46. The detailed procedure for calculating the required times between pulses is described hereinafter. The result of the calculation, a list or table of times starting with initial velocity $V_0$ and ending with maximum velocity $V_m$, is stored in the RAM 48 for later readout during acceleration and deceleration. For deceleration from $V_m$ to $V_0$, the stored times are read from memory in a direction opposite to that used during acceleration.

Figure 5:
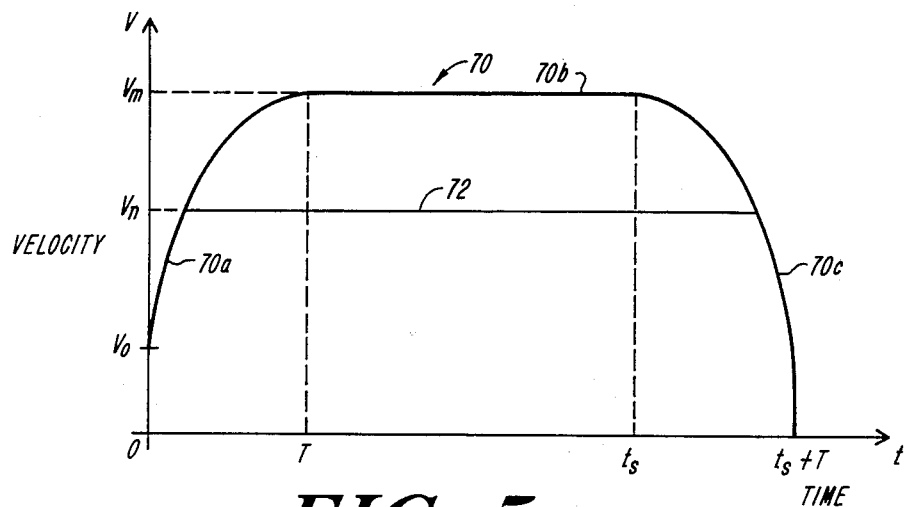
FIG. 5 is a graphic representation of velocity as a function of time showing a stepper motor movement utilizing a parabolic velocity profile.

After determining the pulse timing, the controller is ready for operation of the stepper motor 60. Motor commands are typically supplied through the parallel input to the microprocessor 40. A typical command is to move the motor by a given amount, for example, 3,000 steps. Such a movement is illustrated as curve 70 in FIG. 5. To execute the command, the microprocessor 40 supplies the required 3,000 steps through the state generator 54 and the switching amplifier 56 to the stepper motor 60. The timing between pulses in accordance with the calculated values provides acceleration along parabolic velocity curve 70a until maximum velocity $V_m$ is reached. A constant velocity $V_m$ is maintained along curve 70b until deceleration begins. Then, pulses are timed to decelerate the motor along parabolic velocity curve 70c in accordance with the calculated values until $V_0$ is reached. Acceleration and deceleration are each accomplished in the specified time T. In another operating mode, the motor is operated at a velocity $V_n$ less than $V_m$, as indicated by curve 72 in FIG. 5. The motor is accelerated along the parabolic curve 70a to $V_n$ and decelerated along parabolic curve 70c to $V_0$. The required movements are accomplished efficiently and in considerably less time than was possible with prior art linear velocity profiles.

In a preferred embodiment, the microprocessor 40 is a type 8031H eight-bit microprocessor. The PROM 46 is a type P27128A. The RAM 48 is a type 6264 and the parallel interface unit 50 is a type 8255. These devices are available from Intel Corporation of Santa Clara, California. The serial interface unit 52 can be a type MAX232 RS232 interface unit available from Maxim, Inc. The state generator 54 converts the step and the direction outputs from the microprocessor 40 into properly phased signals to drive windings A, A*, B, and B* of the stepper motor 60. The switching amplifier 56 provides signals of the required voltage and current to the stepper motor 60. Typically, the switching amplifier 56 can supply voltages from 30 to 80 volts DC and currents of 1 to 5 amps per phase. The battery back-up unit 64 includes a conventional voltage sensing circuit which senses the supply voltage and switches to a back-up battery if the supply voltage drops below a prescribed level.

Now the algorithm used by the microprocessor 40 in calculating the times between energizing pulses will be described. It will be understood that the resulting pulse train during starting comprises pulses of constant amplitude and width and of a frequency which increases during acceleration and which decreases during deceleration, so as to provide a parabolic velocity profile. After reaching the maximum velocity $V_m$, the pulse train has a constant frequency until the motor begins deceleration.

The parabolic velocity profile of FIG. 3 may be described by the equation $$V = pt^2 + qt + V_0 \tag{1}$$

Where
V = instantaneous velocity,
t = time, and
p,q are constants.
From the constraints $$V = V_0 \text{ at } t = 0,$$

$$V = V_m \text{ at } t = T, \text{ and}$$

$$dV/dt = 0 \text{ at } t = T,$$

p and q are calculated as $$p = \frac{V_0 - V_m}{T^2} \tag{2}$$

and $$q = \frac{2(V_m - V_0)}{T}. \tag{3}$$

Substituting equations (2) and (3) into equation (1), we obtain $$V = \left(\frac{V_0 - V_m}{T^2}\right) t^2 + \left[\frac{2(V_m - V_0)}{T}\right] t + V_0 \tag{4}$$

Equation (4) describes the parabolic velocity profile in terms of $V_0$, $V_m$ and T. The acceleration a is given by $$a = dV/dt = 2pt + q \tag{5}$$

The acceleration is a linear function of time. The initial acceleration $a_0$ when t=0 is given by $$a_0 = q = \frac{2(V_m - V_0)}{T} \tag{6}$$

In addition, the rate of change of acceleration is given by $$\frac{da}{dt} = 2p \tag{7}$$

$$\Delta a = 2p\Delta t \tag{8}$$

$$a_n = a_{n-1} + \Delta a \tag{9}$$

$$= a_{n-1} + 2pt_{n-1}$$

The time $t_n$ for each pulse or step of the motor is calculated one step at a time starting with the first step and proceeding successively to the last step. The velocity $V_1$ at time $t_1$ after the first step is given by $$V_1 = V_0 + a_0 t_1 \tag{10}$$

$$V_1 = N/t_1, \tag{11}$$

where N=number of steps. For the first step N=1. Since the calculation is done one step at a time, N=1 for all other calculations. Substituting equation (11) with N=1 into equation (10) gives $$a_0 t_1^2 + V_0 t_1 - 1 = 0 \tag{12}$$

Equation (12) can be solved for the time $t_1$. Repeating the analysis for succeeding steps one obtains the following general equation in which the time $t_n$ is the variable.

$$(a_{n-1} + 2p \cdot t_{n-1}) m^2 + \frac{1}{t_{n-1}} \cdot t_n - 1 = 0 \tag{13}$$

Equation (13) is solved for a set of times $t_n$ until $1/t_{n=vm}$. These values of times $t_n$ (for n=1 to n=N) are the times between pulses supplied to the stepper motor to provide a parabolic velocity profile from the selected values of $V_0$, $V_m$ and T.

The number of steps to reach $V_m$ corresponds to the integral, $$N = \int_0^T V dt = \int_0^T \left\{ \left( \frac{V_0 - V_m}{T^2} \right) t^2 + \left[ \frac{2(V_m - V_0)}{T} \right] t + V_0 \right\} dt \tag{14}$$

$$= \tfrac{1}{3}(V_0 + 2V_m)T, \text{ rounded off to the nearest integer.}$$

The software routine executed by the microprocessor 40 in calculating the required times between pulses to produce a parabolic velocity profile is set forth below.

1. Input parameters:
VMIN—minimum speed (start/stop speed)
VMAX—desired maximum speed
T—acceleration time
2. Calculate timing of the first pulse t=1/VMIN
3. Calculate timing of the pulses for speed VMAX
4. Calculate coefficients used in all calculation that follows:
A=2*(VMAX−VMIN)/T
B=VMIN
5. Timing for all steps calculated solving quadratic equation using formula
NEXT=(A*PREV∧2+1)/(2*A*PREV+B)
where
PREV - previous approximation (1/VMIN for first step)
NEXT - new approximation
6. Equation is solved until desired accuracy is achieved. Solution represents timing value for given step.
7. While (NEXT)>(1/VMAX)
Do:
Calculate acceleration rate for current step as follows:
ACCEL=ACCEL−A/(T*NEXT)
Equation is solved for each step on acceleration profile. New coefficients are as follows:
A=ACCEL
B=1/NEXT
PREV=NEXT
NEXT=(A*PREV∧2+1)/(2*A*PREV+B)
END The software routine to provide a desired movement of the motor is set forth below.
1. Input parameters:
VPGM—desired speed of travel
DIST—desired distance of travel
2. System parameters:
VMAX—maximum speed
VMIN—minimum speed
N—number of steps to reach maximum speed
If (VPGM<VMIN) /* no acceleration needed */
If (VPGM>VMAX) /* error condition */
3. Procedure to perform move of desired distance (DIST) at maximum possible speed.

```
If (DIST/2) < N      /* maximum speed
                        can not be reached */
{
If (DIST/2) even number
                     {
                     ACNT = DIST / 2
                     DCNT = ACNT
                     }
else
                     {
                     SLEW = 1
                     ACNT = (DIST − 1)/2
                     DCNT = ACNT
                     }
}
else
                     {
                     ACNT = N
                     DCNT = N
                     SLEW = DIST − 2*N
                     }
```
where
ACNT - pulse count during acceleration
DCNT - pulse count during deceleration
SLEW - number of pulses issued at -continued

| |
|---|
| desired speed |

4. Procedure to perform move at desired speed VPGM.

Determine number of steps needed to reach desired speed.

```
N = 0
while (1/VPGM) > table value
{
N = N + 1
table value = next table value
}
```

5. Use procedure above to determine whether desired speed can be achieved for the desired distance of move and calculate parameters ACNT, DCNT, SLEW.

While there has been shown and described what is at present considered the preferred embodiments of the present invention, it will be understood by those skilled in the art that various changes and modifications may be made therein without departing from the scope of the present invention as defined by the appended claims.

What is claimed is:

1. A method for controlling a stepper motor comprising:

supplying to the stepper motor a series of electrical pulses of suitable amplitude and pulse width to advance the stepper motor; and controlling the times between said pulses to provide a parabolic stepper motor velocity profile between a start/stop velocity $V_0$ at a time $t=0$ and a maximum velocity $V_m$ at a time $t=T$.

2. A method for controlling a stepper motor as defined in claim 1 wherein the step of controlling the times between pulses includes the steps of calculating the required times between pulses to provide said parabolic velocity profile from prescribed values of $V_0$, $V_m$ and T; and controlling the times between pulses supplied to the motor in accordance with the calculated values of required times between pulses.

3. A method for controlling a stepper motor as defined in claim 2 further including the step of storing the calculated values of required times between pulses and wherein the step of controlling the times between pulses includes reading the stored values as pulses are supplied to the motor, and varying the pulse timing in accordance therewith.

4. A method for controlling a stepper motor as defined in claim 3 wherein the step of calculating the required times between pulses includes calculating times $t_n$ as a solution of $$(a_{n-1} + 2p \cdot t_{n-1}) t_n^2 + \frac{1}{t_{n-1}} \cdot t_n - 1 = 0,$$

$$\text{where } p = \frac{V_0 - V_m}{T^2},$$

$$a_n = a_{n-1} + 2p \cdot t_{n-1}, \text{ and}$$

$$a_0 = \frac{2(V_m - V_0)}{T}$$

and the equation is solved for $t_n$ until $1/t_n = V_m$.

5. A stepper motor controller comprising:

means for supplying to the stepper motor a series of electrical pulses of suitable amplitude and pulse width to advance the stepper motor; and means for controlling the times between said pulses to provide a parabolic stepper motor velocity profile between a start/stop velocity $V_0$ at a time $t=0$ and a maximum velocity $V_m$ at a time $t=T$.

6. A stepper motor controller as defined in claim 5 wherein said means for controlling the times between pulses includes means for calculating the required times between pulses to provide said parabolic velocity profile from prescribed values of $V_0$, $V_m$ and T, and means for controlling the times between pulses supplied to the motor in accordance with the calculated values of required times between pulses.

7. A stepper motor controller as defined in claim 6 further including means for storing the calculated values of required times between pulses and wherein said means for controlling the times between pulses includes means for reading the stored values as pulses are supplied to the motor and means for varying the pulse timing in accordance therewith.

8. A stepper motor controller as defined in claim 7 wherein said means for calculating the required times between pulses includes means for calculating times $t_n$ as a solution of $$(a_{n-1} + 2p \cdot t_{n-1}) t_n^2 + \frac{1}{t_{n-1}} \cdot t_n - 1 = 0,$$

$$\text{where } p = \frac{V_0 - V_m}{T^2},$$

$$a_n = a_{n-1} + 2p \cdot t_{n-1}, \text{ and}$$

$$a_0 = \frac{2(V_m - V_0)}{T}$$

and the equation is solved for $t_n$ until $1/t_n = V_m$.

9. A method for controlling a stepper motor comprising:

selecting a desired time T to increase the motor velocity from a known start/stop velocity $V_0$ to a desired maximum velocity $V_m$;

determining from $V_0$, $V_m$ and T the required times between motor energizing pulses to provide a parabolic velocity profile between $V_0$ at a time $t=0$ and $V_m$ at a time $t=T$; and supplying to the stepper motor a train of energizing pulses with times between individual pulses controlled to provide said parabolic velocity profile.

10. Apparatus for controlling a stepper motor comprising:

means for determining the required times between motor energizing pulses to provide a parabolic velocity profile between a start/stop velocity $V_0$ at a time $t=0$ and a maximum velocity $V_m$ at a time $t=T$; and means for supplying to the stepper motor a train of energizing pulses with times between individual pulses controlled in accordance with the required times to provide said parabolic velocity profile.

11. A method for controllilng a stepper motor as defined in claim 1 further including the step of controlling the times between said pulses to provide a second parabolic stepper motor velocity profile between the maximum velocity $V_m$ at a time $t=t_s$ and the start/stop velocity $V_0$ at a time $t=t_s+T$.

12. A stepper motor controller as defined in claim 5 further including means for controlling the times between said pulses to provide a second parabolic stepper motor velocity profile between the maximum velocity $V_m$ at a time $t=t_s$ and the start/stop velocity $V_0$ at a time $t=t_s+T$.

13. A method for controlling a stepper motor as defined in claim 9 further including the steps of:
   determining from $V_0$, $V_m$ and T the required times between motor energizing pulses to provide a second parabolic velocity profile between the maximum velocity $V_m$ at a time $t=t_s$ and the start/stop velocity $V_0$ at a time $t=t_s+T$; and
   supplying to the stepper motor a train of energizing pulses with times between the individual pulses controlled to provide said second parabolic velocity profile.

14. A method for controlling a stepper motor comprising:
   supplying to the stepper motor a series of electrical pulses of suitable amplitude and pulse width to advance the stepper motor; and
   controlling the times between said pulses to provide a parabolic stepper motor velocity profile between a maximum velocity $V_m$ at a time $t=t_s$ and a start/stop velocity $V_0$ at a time $t=t_s+T$.

15. A stepper motor controller comprising:
   means for supplying to the stepper motor a series of electrical pulses of suitable amplitude and pulse width to advance the stepper motor; and
   means for controlling the times between said pulses to provide a parabolic stepper motor velocity profile between a maximum velocity $V_m$ at a time $t=t_s$ and a start/stop velocity $V_O$ at a time $t=t_s+T$.

16. A method for controlling a stepper motor comprising:
   selecting a desired time T to decrease the motor velocity from a maximum velocity $V_m$ to a start/stop velocity $V_0$;
   determining from $V_0$, $V_m$ and T the required times between motor energizing pulses to provide a parabolic velocity profile between the maximum velocity $V_m$ at a time $t=t_s$ and the start/stop velocity $V_0$ at a time $t=t_s+T$; and
   supplying to the stepper motor a train of energizing pulses with times between individual pulses controlled to provide said parabolic velocity profile.

\* \* \* \* \*